July 8, 1958 R. M. JONES 2,842,746

ELECTRICAL DELAY LINE

Filed May 9, 1955

INVENTOR
ROBERT M. JONES
BY Lippincott and Smith
ATTORNEYS 2,842,746

ELECTRICAL DELAY LINE

Robert M. Jones, Atherton, Calif., assignor to Admiral Corporation, Chicago, Ill., a corporation of Delaware Application May 9, 1955, Serial No. 506,852

2 Claims. (Cl. 333—29)

This invention relates to electrical transmission lines for providing a time delay in electric signals transmitted thereby, commonly called delay lines, and in particular to improved, compact delay lines having inductive windings and large values of distributed capacitance.

In television and other electronic apparatus, it is often required that an electric signal be delayed for a small predetermined time interval, to bring such signal into proper time or phase relation with another signal, for example. This is customarily done by means of a delay line, and various types of delay lines have been used in such applications. It is desirable that the delay line should be compact, inexpensive, and stable with respect to its electrical characteristics. It is also generally desirable that attenuation of the signal by the delay line should be small, and it is particularly desirable in many applications that the amount of attenuation and the amount of time delay should be substantially constant over the range of frequencies included in the transmitted signal, or should have other desired characteristics. In the case of television apparatus, for example, transmitted signals may have frequency components covering a range of several megacycles, and the delay line must have satisfactory characteristics throughout this frequency range.

One type of prior art delay line consists essentially of a single-layer, helical coil for transmitting the electric signal and a grounded conductive strip extending longitudinally within and adjacent to the coil for providing shunt capacitance distributed along the length of the delay line. Since the delay time is proportional to the square root of the product of the series inductance times the shunt capacitance of the line, the coil is usually made from many turns of relatively fine wire to provide a high value of series inductance, and the grounding strip is disposed close to the inner surface of the coil to provide a high value of shunt capacitance.

Although prior art delay lines constructed in this manner have certain advantages over other prior art delay lines their characteristics are not ideal for all applications. For example, the length of single layer winding required for the desired value of series inductance may make the coil longer than is desirable from the standpoint of compactness. Furthermore, some magnetic flux passes between successive turns of the coil, and phase shifts occur along the length of the coil; both substantially reduce the series inductance below the value which would be expected from the number of turns used in the coil. Unless compensated, this reduction of the series inductance increases with increasing frequency so that the delay time generally varies to some extent as a function of frequency in such prior art lines.

The use of fine wire results in relatively large electrical losses, and also makes winding of the coil more difficult and expensive. Better inductance characteristics can be obtained by the use of a multilayer coil, but in a delay line constructed in accordance with prior practice this would mean that portions of the coil would be relatively remote from the grounding strips, which would reduce the shunt capacitance, and additional problems could arise from large phase differences in adjacent turns. Consequently, according to prior practice a single layer coil has generally been employed.

An object of the present invention is to overcome the disadvantages of previous delay lines and to provide an improved delay line using larger wire sizes, which is more compact and more economical to construct, and which has better electrical characteristics than delay lines heretofore available. Another object is to provide an improved delay line having a lower insertion loss—that is, providing less attenuation of the transmitted signals—than delay lines heretofore used. Another object is to provide an improved delay line which may have larger values of shunt capacitance than has been practicable in delay lines heretofore used, and thus may have a lower characteristic impedance which can be matched more easily to low-impedance circuits. Other objects and advantages will appear as the description proceeds.

Briefly stated, in accordance with one aspect of this invention, a compact, low-loss and low-impedance delay line is constructed with an inductively wound series-connected multilayer coil of relatively heavy wire, and conductive strips are placed between the coil layers so that each layer of the coil is relatively close to one or more of the conductive strips. Preferably, some of the conductive strips are grounded to provide a relatively high shunt capacitance and a relatively low characteristic impedance for the delay line. Others of the conductive strips may be insulated floating "patches" which provide series capacitance to improve the electrical characteristics of the delay line and in particular to make the transmission characteristics more uniform over a range of frequencies, or more closely related to some other desired characteristic. In a preferred embodiment the multilayer winding is divided into axially spaced-apart sections, which may be connected together either in series-aiding or series-bucking relation.

The invention will be better understood from the following description taken in connection with the accompanying drawing, and its scope will be pointed out in the appended claims. In the drawing, Fig. 1 is a side elevation showing a delay line embodying principles of this invention;

Figure 1:
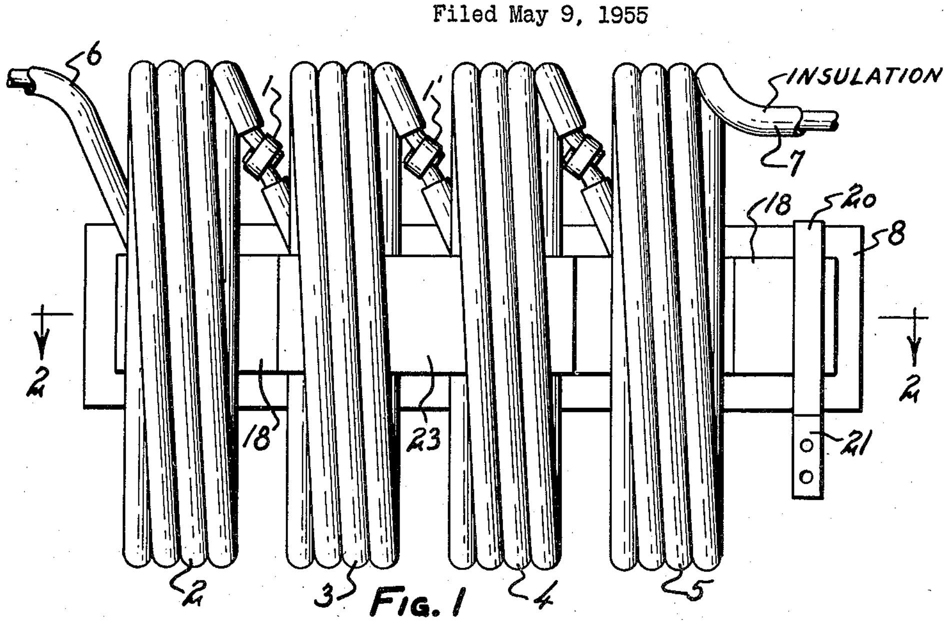
Figure 2:
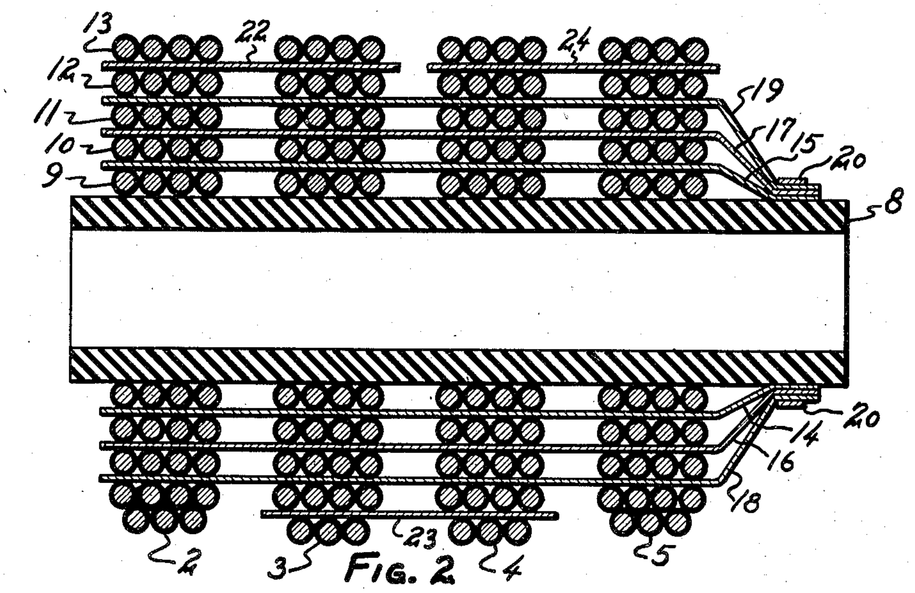
Fig. 2 is a longitudinal section taken along the line 2—2 of Fig. 1.

Referring now to Figs. 1 and 2 of the drawing, a delay line comprises an insulated wire 1 inductively wound into a plurality of axially spaced-apart multilayer winding sections indicated in the drawing by reference numerals 2, 3, 4 and 5. These winding sections are connected in series so that an electric signal may be transmitted between the ends 6 and 7 of wire 1. The windings are supported upon a suitable coil form 8 which preferably is a cylindrical tube or rod of a low-loss insulating material such as polystyrene.

Each of the winding sections 2, 3, 4 and 5 consists of a plurality of helically wound winding layers 9, 10, 11, 12 and 13 connected in series and disposed successively one upon and around another, as shown. To facilitate manufacture the multilayer sections 2, 3, 4 and 5 preferably are wound simultaneously with separate lengths of wire, and the leads from each section are soldered or otherwise connected together, as shown at 1', to form a continuous wire 1. The winding sections may be connected together with series-aiding mutual inductances, as shown, or with opposing mutual inductances, or a combination of aiding and opposing inductances. The amount of mutual inductance between winding sections depends upon the spacing between sections, and the amount and direction of inductive coupling between sections may be selected to provide a desired phase characteristic.

A plurality of electrically conductive strips extend longitudinally parallel to the axis of cylindrical form 8 between successive winding layers. Strips 14 and 15 extend through all of the four winding sections between winding layers 9 and 10; strips 16 and 17 extend through all of the four winding sections between winding layers 10 and 11; and strips 18 and 19 extend through all of the four winding sections between winding layers 11 and 12. Strips 14, 16 and 18 are held together at one end against coil form 8 by an annular metal band 20 integral with a terminal lug 21. Strips 15, 17 and 19 are also held together at one end against coil form 8 by metal band 20, so that the strips numbered 14 through 19 are electrically connected to one another and to terminal lug 21.

Lug 21 is a terminal common to the input and output circuits of the delay line, and is generally connected to ground or its equivalent in the electrical circuit. Accordingly, the strips numbered 14 through 19 may be called grounding strips; and the capacitances between various parts of wire 1 and these grounding strips provide the major portion of shunt capacitance in the delay line. If desired, an additional grounding strip may be placed between the bottom winding layer 9 and the coil form 8.

In this embodiment, the several turns of wire 1 are insulated from each other and from the grounding strips by the insulation which covers the wire but it will be understood that equivalent insulating means may be used when desired, such as air spaces between adjacent turns in each winding layer and sheets of insulating material separating the winding layers from one another and from the grounding strips. However, it is generally most convenient to use wire coated with an insulating material such as lacquer, Formvar or Teflon. If desired, insulating material between the winding layers can be used in addition to an insulating coating on the wire. Polyethylene tape may be used for this purpose. The grounding strips may advantageously be thin strips of electrically conductive metal foil.

In addition to the grounding strips which provide shunt capacitance, floating strips or "patches" may be used for adding series capacitance to improve the electrical characteristics of the delay line. In the embodiment shown, strips 22, 23 and 24 are floating strips or "patches," and are similar to the grounding strips except that they are shorter in length and are electrically floating—that is, they are not directly connected to any other part of the electrical circuit, but are capacitively connected to adjacent portions of wire 1. Strip 22 extends only through winding sections 2 and 3 between the two outermost winding layers 12 and 13, and it provides series capacitance between coupled turns in winding sections 2 and 3. Strip 23 extends only through winding sections 3 and 4 between the two outermost winding layers and it provides series capacitance between coupled turns in winding sections 3 and 4. Strip 24 extends only through winding sections 4 and 5 between the two outermost winding layers and it provides series capacitance between coupled turns in winding sections 4 and 5.

As the frequency of an electric signal transmitted through wire 1 increases, the wavelength along the wire decreases and the respective currents flowing in successive ones of the winding sections 2, 3, 4 and 5, and through coupled turns within each of the sections become more and more out of phase. This decreases the mutual inductance coupling between successive winding turns and sections, and if not compensated would cause the delay time and the attenuation of the signal to vary as a function of frequency. However, as the frequency increases the capacitive coupling between successive turns and winding sections also increases, and by appropriate design of the windings, the grounding strips and the floating patches, the transmission characteristics of the delay line can be made relatively constant over a substantial frequency range, or can be made to correspond closely to other desired characteristics. The amount of series capacitance can be increased by increasing the size or the number, or both, of the floating strips; and by calculation or by experiment the best size of strips 22, 23 and 24, together with other design parameters of the delay line, can be determined for the particular transmission characteristics which are desired.

Because of the multilayer winding construction which is used in this delay line the structure is exceptionally compact and the ratio of inductance to resistance is high. In the embodiment illustrated, each winding layer, except the outermost layer 13, is immediately adjacent to at least one of the grounding strips and several of the winding layers are immediately adjacent to two of the grounding strips. This provides exceptionally large values of shunt capacitance so that relatively large times delays can be obtained with a small, compact structure. In addition, the large value of shunt capacitance provides a low characteristic impedance, so that the improved delay line can be more easily matched to low-impedance circuits than is the case with prior art delay lines having higher characteristic impedances.

Furthermore, the wire size in the new delay line can be made considerably larger than was customary prior practice, without undue loss of compactness or the desirable high shunt capacitance. The larger wire size leads to several advantages: for example, the resistance is reduced with a consequent reduction in electrical losses; manufacturing techniques are made simpler and less expensive; and the structure becomes more stable mechanically with a corresponding improvement in the stability of electrical characteristics. The delay line can be manufactured economically by using a conventional multiple winding machine to wind a length of wire for each winding section about winding form 8, and by stopping the machine upon completion of each winding layer to insert a conductive strip. When the windings have been completed, band 20 is fastened in place around the winding form and one end of the grounding strips, and leads from the respective sections are soldered together to complete the composite winding.

As hereinbefore explained, the conductive strips, numbered 14 through 19 and 22 through 24, may be strips of metal foil inserted between the winding layers. If desired, strips 14 and 15 may be made from a single sheet of foil, preferably slotted or splined to reduce eddy current losses, strips 16 and 17 may be made from another sheet of foil, and strips 18 and 19 may be made from a third sheet of foil. Alternatively, the conductive strips may be mounted on sheets of insulating material positioned between adjacent winding layers and insulating one winding layer from another.

Figure 3:
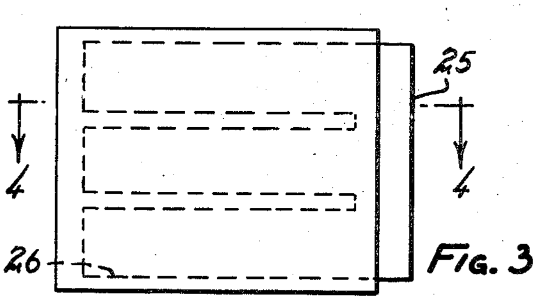
Fig. 3 is a developed view, on a smaller scale, showing an alternative grounding strip to be inserted between winding layers of a delay line.
Figure 4:
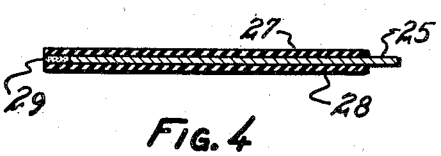
Fig. 4 is a section taken along the line 4—4 of Fig. 3.

Referring now to Figs. 3 and 4, a grounding strip 25 preferably is a sheet of thin metal foil having longitudinal slots extending from one of its ends, as shown by broken lines in Fig. 3, to form a plurality of laterally spaced-apart strips 26. Sheet 25 is sandwiched between two sheets of insulating material 27 and 28 which may be bonded together by adhesive material 29. The foil and insulation assembly is inserted between the winding layers, and the sheets of insulating material insulate the winding layers from each other and from the conductive sheet 25. This construction permits the use of higher voltages than does the construction shown in Figs. 1 and 2. The exposed portion at the right end of foil sheet 25 is connected to the other grounding strips and to terminal lug 21 by band 20 as in Figs. 1 and 2. The slots in sheet 25 substantially eliminate eddy currents which would have undesirable effects.

It will be understood that this invention is not limited to specific embodiments herein illustrated and described, and that the following claims are intended to cover all changes and modifications which do not depart from the true spirit and scope of the invention.

What is claimed is:

1. An electrical delay line comprising a plurality of axially spaced-apart winding sections electrically connected in series, each of said winding sections consisting of a plurality of winding layers disposed successively one upon another, a first electrically conductive strip extending through said winding sections between adjacent ones of said winding layers, a second electrically conductive strip extending through said winding sections between adjacent ones of said winding layers, and means for connecting said first conductive strip to ground, said second conductive strip being electrically floating with no direct circuit connections.

2. An electrical delay line comprising a cylindrical coil form, a wire having an insulating coating, said wire being wound about said form into a plurality of axially spaced-apart winding sections connected in series, each of said winding sections consisting of a plurality of series-connected winding layers disposed successively one upon another, a first plurality of conductive metal foil strips each extending through each of said winding sections between adjacent ones of said winding layers, a second plurality of electrically conductive metal foil strips each extending through two of said winding sections between adjacent ones of said winding layers, and an annular metal band surrounding one end of each of said first plurality of strips and holding that end of said strips in contact with each other and with said winding form, whereby said first plurality of strips are electrically connected to one another, and a terminal lug attached to said band for connecting said first plurality of strips to ground, said second plurality of strips being electrically floating with no direct circuit connections.

References Cited in the file of this patent

UNITED STATES PATENTS

| | | |
|---|---|---|
| 1,695,122 | Phillips | Dec. 11, 1928 |
| 1,759,332 | Whittle et al. | May 20, 1930 |
| 2,008,859 | Ganz | July 23, 1935 |
| 2,233,748 | Rust | Mar. 4, 1941 |
| 2,461,061 | Kallman | Feb. 8, 1949 |

FOREIGN PATENTS

| | | |
|---|---|---|
| 570,087 | Great Britain | June 21, 1945 |